United States Patent
Martell et al.

(10) Patent No.: US 10,534,351 B1
(45) Date of Patent: Jan. 14, 2020

(54) AUTOMATION SYSTEM NETWORK

(71) Applicant: Quest Automated Services, LLC, Tulsa, OK (US)

(72) Inventors: Ed Martell, Arlington, TX (US); Hanz Da Silva, Fort Worth, TX (US); Adam Cooper, Tulsa, OK (US)

(73) Assignee: Quest Automated Services, LLC, Tulsa, OK (US)

( * ) Notice: Subject to any disclaimer, the term of this patent is extended or adjusted under 35 U.S.C. 154(b) by 0 days.

(21) Appl. No.: 16/154,356

(22) Filed: Oct. 8, 2018

(51) Int. Cl.
*G05B 19/418* (2006.01)
*H04L 29/12* (2006.01)

(52) U.S. Cl.
CPC ... *G05B 19/41845* (2013.01); *G05B 19/4183* (2013.01); *G05B 19/4185* (2013.01); *H04L 61/2038* (2013.01); *G05B 19/41835* (2013.01)

(58) Field of Classification Search
CPC .......... G05B 19/41845; G05B 19/4183; G05B 19/4185; G05B 19/41835; H04L 61/2038
See application file for complete search history.

(56) References Cited

U.S. PATENT DOCUMENTS

| | | | |
|---|---|---|---|
| 4,772,876 A | 9/1988 | Laud | |
| 5,675,830 A | 10/1997 | Satula | |
| 5,886,894 A | 3/1999 | Rakoff | |
| 6,385,562 B1 | 5/2002 | Roth et al. | |
| 6,653,899 B2 | 11/2003 | Organvidez et al. | |
| 6,792,337 B2 | 9/2004 | Blackett et al. | |
| 6,843,362 B2 | 1/2005 | Tachibana et al. | |
| 6,865,596 B1 | 3/2005 | Barber et al. | |
| 7,213,061 B1 | 5/2007 | Hite et al. | |
| 7,228,363 B1 | 6/2007 | Wehrle et al. | |
| 7,613,542 B2 | 11/2009 | Ko et al. | |
| 7,719,961 B2 | 5/2010 | Sichner et al. | |
| 7,865,252 B2 | 1/2011 | Clayton | |
| 8,483,848 B2 * | 7/2013 | Langejurgen | H04L 12/40 700/9 |
| 8,548,607 B1 | 10/2013 | Belz et al. | |
| 8,581,439 B1 | 11/2013 | Clayton et al. | |
| 8,757,363 B2 | 6/2014 | Combs et al. | |
| 9,100,397 B2 | 8/2015 | Li et al. | |
| 9,819,544 B2 * | 11/2017 | Gagnon | H04L 12/40019 |
| 10,070,470 B2 * | 9/2018 | Gervais | H04L 41/12 |
| 2003/0112148 A1 * | 6/2003 | Belliveau | H04L 12/403 340/12.22 |
| 2006/0140182 A1 * | 6/2006 | Sullivan | H04L 29/12009 370/389 |
| 2007/0061484 A1 * | 3/2007 | Droms | H04L 61/2015 709/245 |
| 2007/0168440 A1 * | 7/2007 | Cobelens | H04L 67/16 709/207 |

(Continued)

*Primary Examiner* — Charles R Kasenge
(74) *Attorney, Agent, or Firm* — Hall Estill Attorneys at Law; Tyler J. Mantooth

(57) ABSTRACT

An automation system network can have a host connected to a first device via a network with the first device having a processor that assigns a first address to the first device, imports factory information from a second device connected to the first device via the network, and assigns a second address for the second device. At least one automation activity may be executed with the first device and the first and second addresses are employed to conduct device-to-device communications.

18 Claims, 6 Drawing Sheets

(56) References Cited

U.S. PATENT DOCUMENTS

| | | | | |
|---|---|---|---|---|
| 2008/0107131 A1* | 5/2008 | Ma | ............ | H04L 41/0803 370/468 |
| 2010/0299401 A1* | 11/2010 | Lloyd | ............ | G06F 15/16 709/209 |
| 2011/0153793 A1* | 6/2011 | Tan | ............ | H04L 63/0272 709/222 |
| 2013/0274918 A1* | 10/2013 | Zurbau | ............ | H04L 29/12028 700/245 |
| 2015/0018006 A1* | 1/2015 | Pollmann | ............ | H04L 61/2038 455/456.1 |
| 2015/0085696 A1* | 3/2015 | Guo | ............ | H04W 48/16 370/254 |
| 2015/0227482 A1* | 8/2015 | Winter | ............ | G06F 13/4234 710/117 |
| 2016/0072761 A1* | 3/2016 | Shih | ............ | H04L 61/2015 709/220 |
| 2016/0127173 A1* | 5/2016 | Gagnon | ............ | H04L 12/40019 709/211 |
| 2017/0071015 A1* | 3/2017 | Gervais | ............ | H04W 4/80 |
| 2017/0366397 A1* | 12/2017 | Gerspach | ............ | H04L 41/0806 |
| 2018/0276154 A1* | 9/2018 | Hansing | ............ | H04L 12/12 |

* cited by examiner

AUTOMATION SYSTEM NETWORK

SUMMARY

An automation system network, in accordance with assorted embodiments, has a host connected to a first device and a second device via a network with the first device having a processor configured to assign a first address to the first device in response to factory information imported from the first device and a second address to the second device in response to factory information imported from the second device. The first and second addresses used for direct device-to-device communications.

In some embodiments, an automation system network has a host connected to a first device via a network with the first device having a processor that assigns a first address to the first device, imports factory information from a second device connected to the first device via the network, and assigns a second address for the second device. At least one automation activity is executed with the first device and the first and second addresses are employed to conduct device-to-device communications.

Various embodiments configure an automation system network with a host connected to a first device and a second device via a network with the first device having a processor that assigns a first address to the first device in response to imported factory information from the first device and assigns a second address for the second device in response to imported factory information from the second device. At least one automation activity is executed with the first device and the first and second addresses are employed to conduct device-to-device communications. A two-way communication is conducted between the second device and the host.

DETAILED DESCRIPTION

General embodiments of the present disclosure are directed to automation systems with optimized integration, operation, and reliability.

Automation has traditionally progressed in parallel paths with different technologies being developed and implemented concurrently. Such parallel technology paths have created complex operating environments where diverse technologies are being used to collect and execute data. While the use of diverse technologies is possible, such system configuration inhibits modularity and interchangeability as well as the capability to upgrade particular aspects of an automation system. That is, diverse technologies can concurrently operate as installed, but pose challenges over time as a system's components need to be changed or can be upgraded.

Assorted attempts to address the issue of diverse technologies operating as an automation system have implemented protocols and/or downstream software to allow different technologies to coexist as a system. However, such protocols and software have a limited scope and tenure that are dependent on the underlying technologies being utilized. Hence, various embodiments are directed to an automation system that employs data collection and data execution aspects that are agnostic with regard to operating software, protocol, type of operation, and size of the automation system. As a result, any number, and type, of sensor and automated component can be deployed autonomously and with minimal system reconfiguration.

Accordingly, embodiments of the present disclosure configure an automation system to provide plug-and-play operation for any component type and technology by autonomously generating a unique network address for each component. A unique component address allows two-way communication between master and slave system components as well as slave-to-slave communications, which improves system efficiency and capabilities. The use of a unique component address further allows centralized command and control of components having different native protocol, software, and/or operation. The ability to incorporate, and manipulate, diverse component technologies into a single automation system allows for unparalleled system configuration, optimization, and adaptability.

Figure 1:
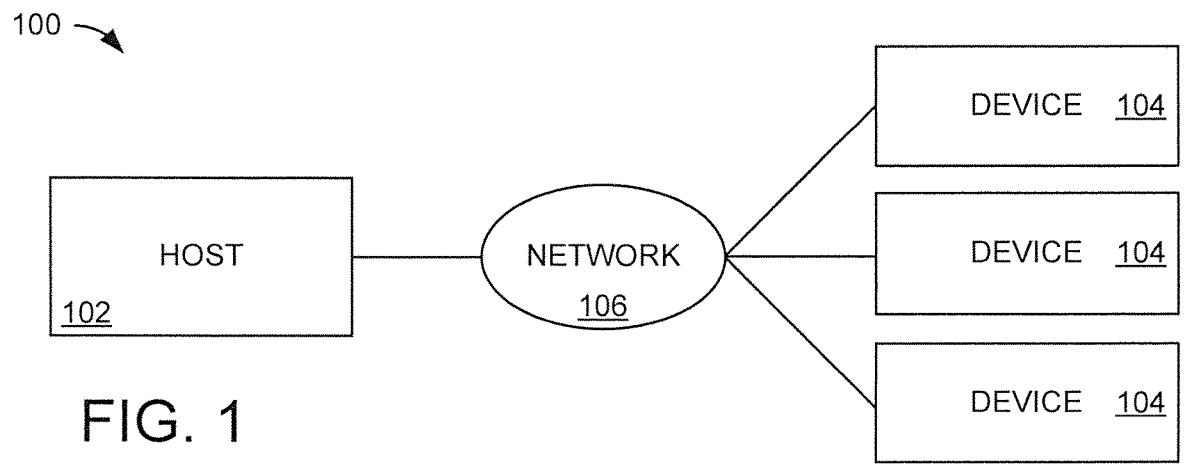
FIG. 1 displays a block representation of an example automation system in which various embodiments may be practiced.

Turning to the drawings, FIG. 1 illustrates block representation of an example automation system 100 arranged in accordance with some embodiments. A host 102 can communicate with any number of devices 104 via one or more networks 106 to conduct automated activity. A host 102 can be any programmable component with the intelligence carry out a predetermined automation instructions with at least one connected device 104. It is contemplated that the various devices 104 can be physically proximal, or distal, and connected to the host 102 with independent, or shared, wired and/or wireless signal pathways.

Figure 2:
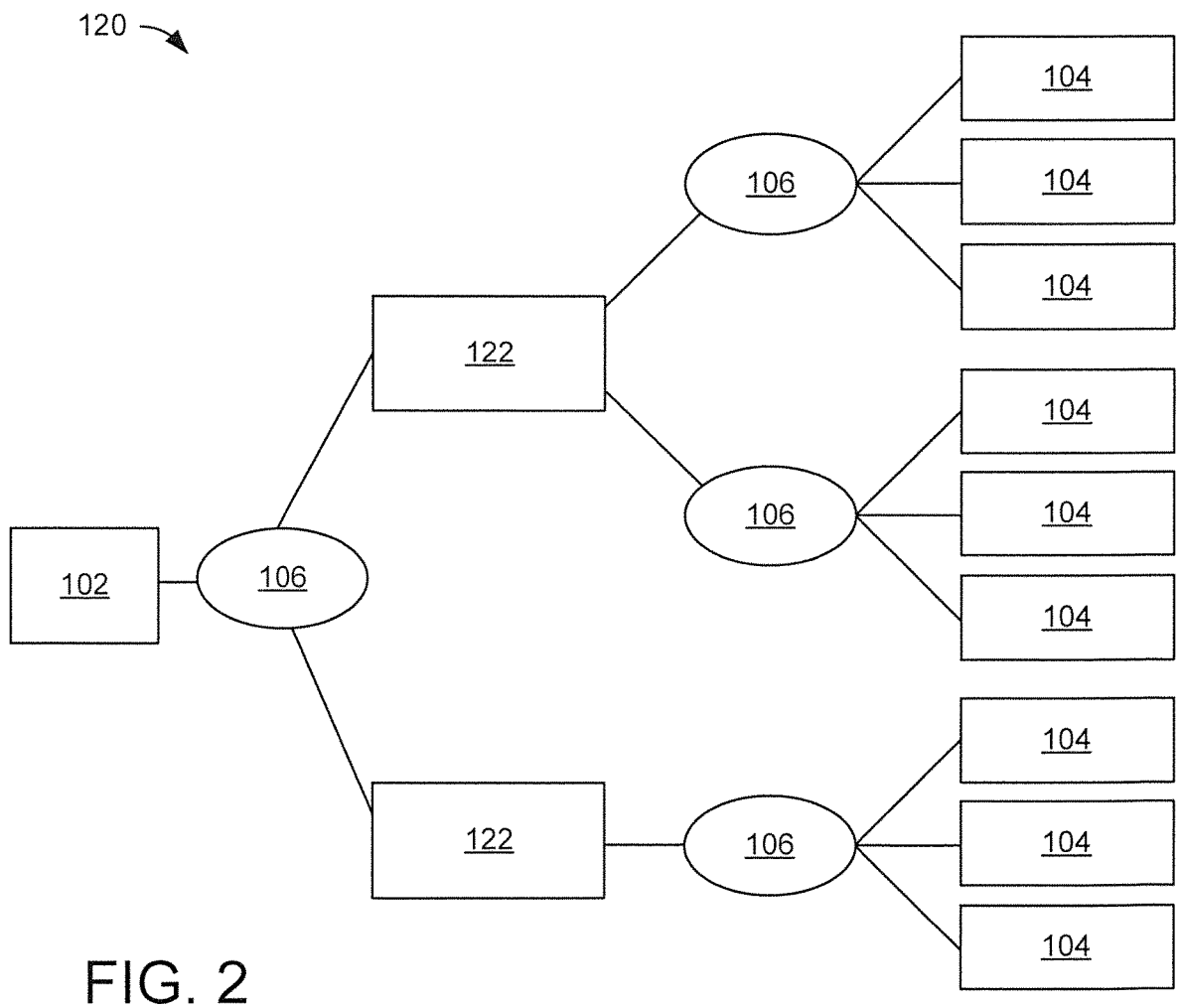
FIG. 2 is a representation of an example automation system arranged in accordance with some embodiments FIG. 3 conveys a block representation of portions of any example automation system configured in accordance with assorted embodiments.

FIG. 2 displays a block representation of an example automation system 120 arranged in accordance with some embodiments with multiple different devices 104 positioned at different sites 122. It is noted that different sites 122 may be physical or logical designation that correspond with different physical locations or a common physical location, such as a warehouse, factory, hydrocarbon exploration location, or hydrocarbon pipeline. Any number of wired, or wireless, networks 106 can provide data and signal pathways between the host 102, sites 122, and devices 104, as shown.

The ability to utilize multiple different automated devices 104 concurrently allows for sophisticated automation implementation that utilize diverse types of automated actions, such as detection, movement, and/or measurement. However, the connection of multiple devices 104 at multiple different sites 122 can increase the difficulty of command deployment and data collection from the host 102 due to the complexity of the system 120. Such operating deficiencies can be exacerbated when one or more devices 104 executes software that needs to be updated or changed. Hence, some embodiments employ virtualized logical operation that decreases the computing complexity of software deployment in multiple different devices 104.

In some embodiments, one or more devices 104 may be operated as a virtual machine by the host 102 where a host operating system is shared by connected devices 104. In yet, the administration of virtual machine virtualization can stress the computing capabilities of the host 102. For instance, the bandwidth of the host 102 can be occupied with policy operations and/or virtualization software in a manner that degrades operational performance to/from the assorted devices 104. As an example, the local loading of an operating system (OS), even though the OS is partially shared with the host 102, can slow the availability of the host 102 and add complexity to the system 120, particularly when numerous different virtual machines are being serviced by the host 102 concurrently. It is noted that by utilizing the host 102 for the various policy and virtualization operations, the devices 104 are treated as "dummy" units that only carry out the instructions designated by the host 102.

Figure 3:
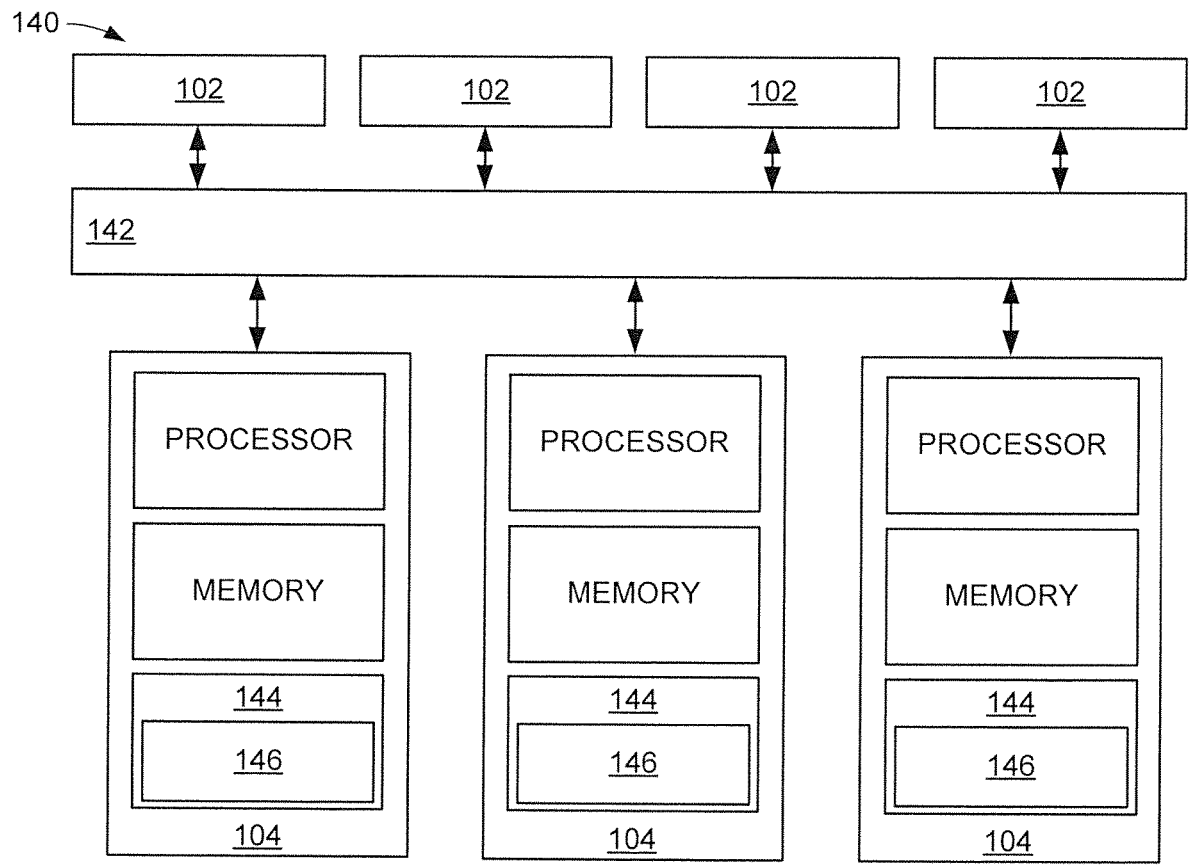

FIG. 3 represents portions of an example distributed automation network 140 configured in accordance with various embodiments to execute container-based virtualization. As shown, the server controller 142 executes a single server operating system that is individually accessed by the remote hosts 102 to execute software on the respective hosts 102.

The server controller 142 can load a container 144 by sending operating components and a software application 146 to the host 102. In this way, the server controller 142 is mimicking the hardware and software of the host 102 to provide a lightweight package that allows relatively quick initialization and alteration due to the lack of an operating system being loaded and executed by the host 102. However, the shared operating system can pose a security threat to sensitive data stored on any portion of the system 140 as well as for control of the server controller 142. As a result, the ease and quickness of deploying container-based virtualization increases, which allows for numerous containers to be concurrently employing the server controller 142 for operating system 140 needs.

Through the efficient deployment of software via container type virtualization shown in FIG. 3, the various devices 104 of an automation system can conduct relatively sophisticated computing capabilities, such as edge computing or network nodes. However, such computing capabilities correspond with relatively large hardware requirements for the constituent devices 104. For instance, greater amounts of processing, memory, and interface hardware are necessary to conduct sophisticated computing, which may not be needed to carry out the automated activity requested from a host 102.

Thus, various embodiments employ at least one device 104 that has minimal computing hardware to carry out instructions provided by the host 102. Such minimal computing hardware allows a device 104 to have a small physical size, reduced cost, and increased operational flexibility. As such, devices 104 with minimal computing capabilities can be characterized as "dummy" components that lack a capability to operate in a virtualized system as a virtual machine or app container.

In yet, other embodiments configure the host 102 and/or site 122 components with computing capabilities that allow logical virtualization. Such components can be characterized as "smart" with the ability to operate as controllers for the various devices 104. Accordingly, assorted embodiments utilize dummy devices 104 in combination with smart site 122 and/or host 102 controllers to utilize physically small, inexpensive, and relatively simple devices 104 in the field.

Figure 4:
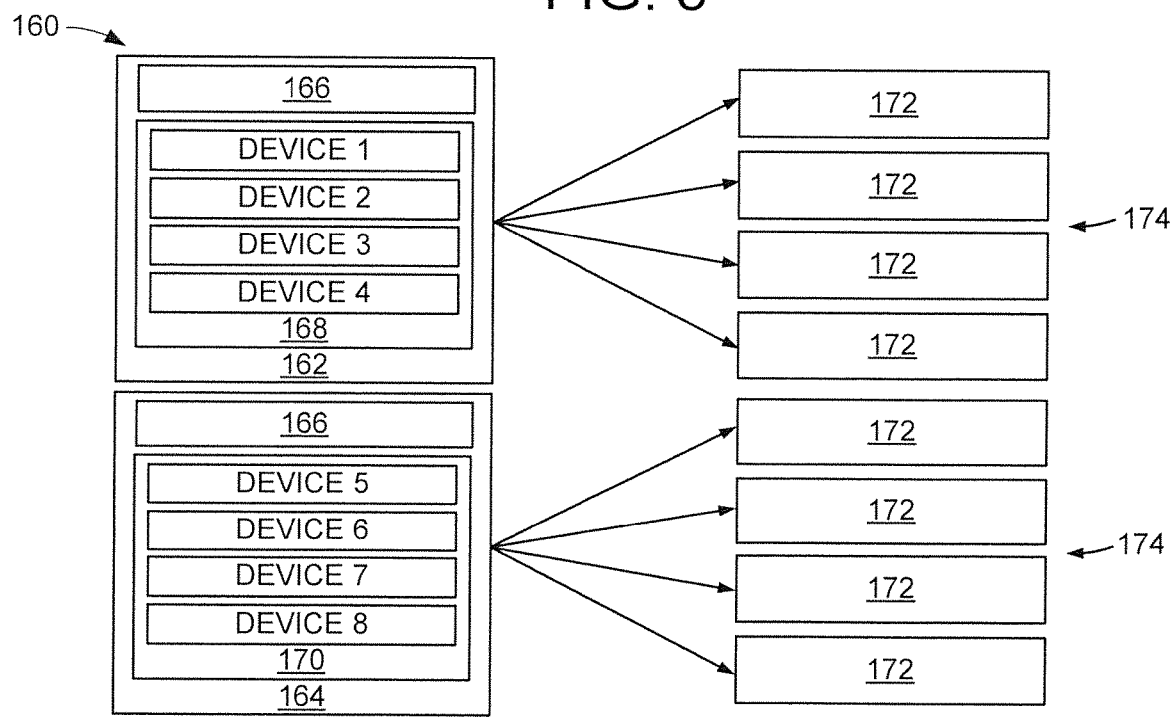
FIG. 4 illustrates portions of an example automation system utilized in accordance with various embodiments.

FIG. 4 represents portions of an example automation system 160 in which various embodiments can be practiced. The automation system 160 has a first host 162 and a second host 164 that are each configured with a processor 166, such as a programmable logic controller, application specific integrated circuit (ASIC), virtual controller, or other intelligent circuitry. Each host 162/164 has a local memory 168/170 that respectively store at least the logical of various system devices (device 1, device 2, etc.). The stored device addresses allow the respective processors 166 to send commands and/or data to the respective devices 172 to conduct automated activity individually or as collective groups 174.

It is noted that the respective hosts 162/164 may be site-level or server-level hosts that are smart components while the various devices 172 are dummy component clients. Although not required or limiting, the devices 172 can have different operation, mechanical, electrical, hydraulic, and physical configurations that allow for activity prescribed by the respective host processors 166. As such, the devices 172 may be sensors, mechanical assemblies, electrical switches, or mechanical-electrical solenoids that operate alone, concurrently, or sequentially to provide a measurement and/or physical action.

For example, the first host 162 can direct hydrocarbon exploration activities by utilizing multiple different devices 172 to detect operational conditions, measure current operating performance, and conduct a predetermined action upon reaching a trigger parameter, such as high pressure or low fluid level. As another non-limiting example, the second host 164 can direct manufacturing activities with one or more devices 172 that result in raw materials being transformed, such as being reconfigured or assembled. It is contemplated that the hosts 162/164 utilize a uniform protocol for communications with the assorted devices 172, such as open platform communications (OPC) or OPC-unified architecture (OPC-UA). However, multiple different software interface and communication protocol can concurrently be utilized between the hosts 162/164 and the devices 172 concurrently, individually, or sequentially.

As installed and initialized for operation, the various logical addresses of the various devices 172 are programmed into the local memory 168/170. Such hard-wired configuration of the device addresses can provide reliable system 160 operation while the system 160 remains in static operation. In the event a device 172 is added, replaced, upgraded, or otherwise changed, the logical address stored in the host 162/164 must be changed, which adds time and complexity to a simple device 172 configuration change. Often, a device 172 configuration change requires a host 162/164 reset operation that can further add partial system 160 downtime to the device reconfiguration procedure. With many systems 160 intending to operate continuously, a device 172 reconfiguration can be quite expensive in terms of time and productivity.

The hard-wiring of device 172 logical addresses in the respective hosts 162/164 can also inhibit the system 160 from sending communications in a two-way manner, as illustrated by arrows 176. That is, storing logical addresses in a centralized location (host) limits the system 160 to communication from the hosts 162/164 to the respective devices 172, as illustrated by arrow 178. In other words, the lack of the devices 172 having knowledge of the logical address of a host 162/164, or other devices 172, prevents commands and data to travel in a two-way manner. Such configuration can be characterized as a master-slave pair that is often utilized in industrial hardware systems employing OPC and OPC-UA communications interfaces and protocol.

It is noted that various embodiments are directed to automated systems 160 where the hosts 162/164 and devices 172 are arranged as master-slave arrangements, but with the slave capable of communicating back to the master and to other slaves of the system 160. While such embodiments may be practiced by placing intelligent computing components with the automated devices 172, such configuration would drastically increase cost, complexity, and power demand on-site while exposing the system 160 to increased risk of environmental degradation, such as from wind, lightning, and water. Accordingly, various embodiments pair a dummy component device 172 with a smart host 162/164 to provide two-way communications and efficient device reconfiguration along with increased data security.

Figure 5:
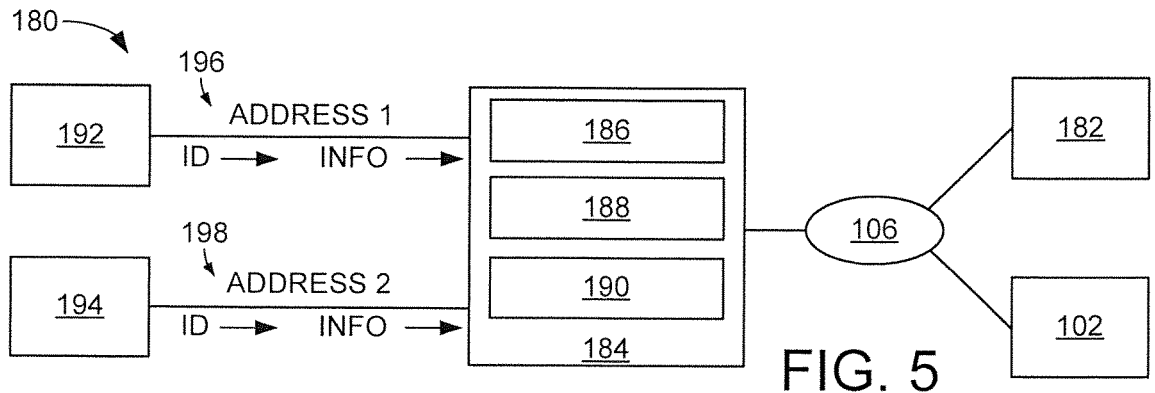
FIG. 5 depicts portions of an example automation system operated in accordance with some embodiments.

FIG. 5 conveys a block representation of portions of an example automation system 180 configured and operated in accordance with various embodiments. The system 180 can have any number of automated devices 172 operating at one or more physical locations and logically separated into one or more sites that are each connected to at least one host 102. Any device 172, site server 182, or host 102 can employ an address module 104 that allows for automatic device discovery, automatic system address generation, and automatic device deployment.

An address module 184 can be constructed as hardware that is physically attached to a device 172, server 182, or host 102 or as software that is executed by a device 172, server 182, or host 102. In one example, the address module 184 has a housing 186 containing a processor 188 and local memory 190 that stores instructions for the processor 188 to identify, address, and implement one or more connected devices 172. In another example, the address module 184 can be software resident in any memory of the system 180 that is executed by any processor or controller of the system 180 to identify address, and implement connected devices 172.

The address module 184 can be configured to continuously, or sporadically, scan electrical and data connections for new, unaddressed components. It is noted that a new component may be a newly changed, upgraded, or otherwise altered device without actually being previously unconnected within the system 180. Upon recognizing a new, unaddressed component, the address module 184 inputs at least the component identification (ID) and information (INFO) and generates a unique system address for that component that allows other aspects of the system 180 to send data and other signals. The unique component address generated by the address module 184 further allows device-to-device, device-to-server, and device-to-host communications by providing source, or destination, information.

In some embodiments, the unique address generated by the address module 184 is based on the input component ID and INFO that is stored in the component from the component's manufacturer. That is, a dummy component being utilized will have default factory data that does not change and is recognized and utilized by the address module 184 to generate a unique system address. It is contemplated that the static, default factory component data have information, such as a serial number, that is unique even between components having identical functions and construction.

In the non-limiting example of FIG. 5, a site server 182 employs an address module 184 that automatically identifies first 192 and second 194 new components and proceeds to automatically generate different respective system addresses 196/198 that are based on the unique component ID and/or INFO assigned during manufacture of the components 192/194. The unique addresses 196/198 are stored in local memory of the system 180 to allow data and signals to pass to the respective components 192/194. Storage of the unique addresses of various components, servers, and hosts can, in some embodiments, be utilized by the components to allow two-way communications, such as between components, component-to-server, and component-to-host.

The ability to monitor a system with one or more address modules 184 to autonomously discover new components and subsequently generate unique system addresses allows the automation system 180 to maintain optimal performance while integrating new components. It is contemplated that the address module 184 can auto-discover new components, auto-address those components, and auto-deploy those components for use without resetting, powering down, or otherwise disrupting system 180 function. For instance, an address module 184 can automatically discover, address, and deploy one or more components by routinely updating one or more databases of the system 180 during selected times, such as when system resources are amply available or before execution of a status or maintenance operation.

Figure 6:
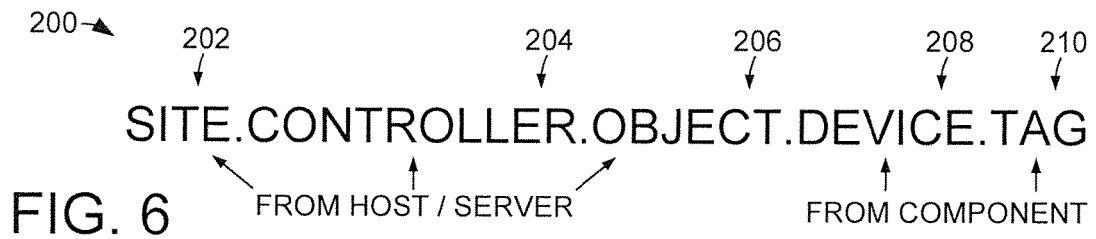
FIG. 6 represents an example component address that can be employed in an automation system.

FIG. 6 depicts an example unique component address 200 that may be generated by an address module in accordance with some embodiments. The unique address 200 can have a hierarchical structure corresponding with the logical, and possibly physical, configuration of the component within an automation system along with the unique component ID and INFO data stored in the component from the factory.

The non-limiting address 200 has a first level identifier 202, second level identifier 204, third level identifier 206, fourth level identifier 208, and a fifth level identifier 210 that respectively distinguish the component from other actual, or potential, addresses of an automation system. The first level identifier 202 may correspond to a site location of the component while the second level identifier 204 corresponds with the controller whose processor directs operation of the component within the assigned site. The third level identifier 206 may correspond with an object in which the component is interacting, such as a tank, pipe, mechanism, or tool. A particular device may be identified by the fourth level identifier 208 of the address and a component tag may be the fifth level identifier 210.

In some embodiments, an address module can input various address information from different sources. For instance, site, controller, and object information can be designated automatically from a host or server while device and tag information is designated from ID and INFO data sourced from the particular component. The host, or server, may be polled by the address module during component deployment to verify the accuracy of the automatically generated component address identifiers. That is, the address module may automatically generate address information for a component that is incorrect until a host, or server, provides correct address information during component deployment, which will alter the automatically generated address.

Figure 7:
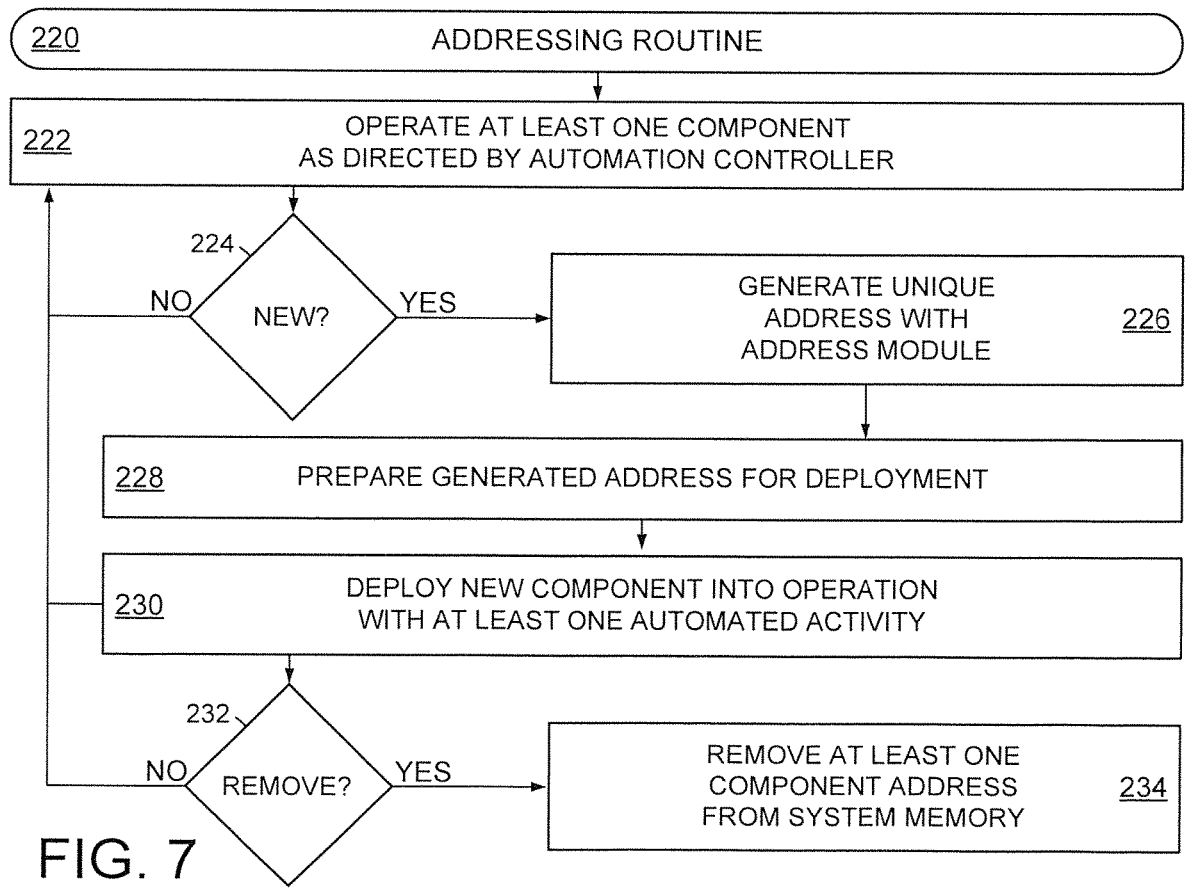
FIG. 7 is an example addressing routine that can be carried out by an automation system in assorted embodiments.

By automatically generating a component address and conducting minor address adjustments, as necessary, components can efficiently be incorporated into sophisticated, and perhaps complex, automated systems, without degrading system capabilities or real-time performance. An example addressing routine 220 is shown in FIG. 7 that conveys how an address module can be operated in an automation system in accordance with some embodiments. Initially, an automation system is arranged so that step 222 can operate at least one component to carry out automated instructions as directed by at least one automated controller.

Step 222 can be continuously, or cyclically conducted any number of times with, or without, modification to the automated instructions, controller, or components. At some time after execution of step 222, decision 224 evaluates if a new component is present. As previously discussed, a new component may be a previously unaddressed device or a newly altered, but previously addressed device. Such detection of a new component via decision 224 can be characterized as auto-discovery due to the system recognizing the presence of a new component without being prompted by a user, resetting operating software, or powering a controller on. In the event no new component is detected in decision 224, routine 220 returns to step 222 in a cyclical fashion.

If a new component is detected, step 226 is triggered to automatically generate a unique address for the component with an address module based on the factory default data provided by the component itself. As a result of step 226, a preliminary component address is stored in the automation system and the address module proceeds to prepare the automation system for deployment of the newly addressed component in step 228. Hence, a newly created address may not be immediately deployed and instead logged for verification and future deployment, which allows for system performance to be maintained throughout the deployment of one or more new components. It is contemplated that deployment of a new address involves assigning a host and/or site controller as well as automated functions to be carried out by the new component.

At a scheduled time, or when a scheduled event occurs, step 230 deploys the new component into operation by conducting at least one automated activity as part of a component test or predetermined automated instructions. It is contemplated that one or more component tests can be conducted for a newly deployed component to optimize component operation, such as to determine in what order components will be activated to execute automated instructions.

With the incorporation of a new address and component into an automation system, decision 232 evaluates if one or more component addresses are to be removed to consolidate the stored component addresses. The presence of unused addresses can occupy valuable system memory and present risk of incorrect automation execution. Hence, addresses that are no longer assigned to an active system component are identified in decision 232 and removed from system memory in step 234. If no superfluous addresses are present, routine cycles back to step 222 where at least one component executes a portion of predetermined automation activities.

The ability to automatically discover, address, and deploy new components in an automation system allows for prolonged optimized performance despite changes over time to hardware and/or software. The automatic generation of a component address further allows a component to be utilized much quicker and more efficiently than if manual programming of the new component was undertaken to incorporate a new component to the system. The unique addressing of components allows a processor to intelligently employ with one or more components via two-way communication. In other words, a unique component address allows a processor to receive data from a component to intelligently select a future automation command from a plurality of different commands to optimize subsequent component operation.

Figure 8:
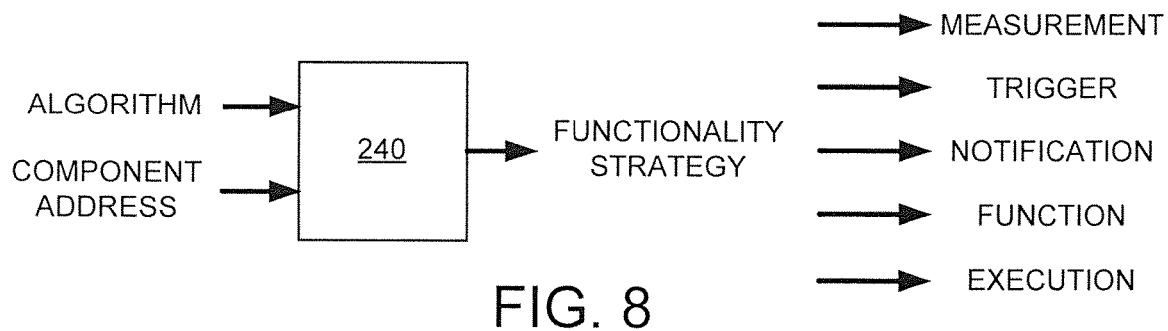
FIG. 8 displays an example processor that can be used in an automation system in accordance with various embodiments.

FIG. 8 illustrates an example processor 240 that can be utilized in an automation system in accordance with various embodiments. It is initially noted that a processor 240 can be resident in any aspect of an automation system, such as in a component, site, and/or host. As such, more than one processor 240 may operate to execute automation activity in one or more components.

A processor 240 can input one or more algorithms and one or more component addresses to create a functionality strategy that conducts a predetermined automation procedure with enhanced performance, such as greater efficiency, lower power consumption, less latency, or greater breadth of automated activities. It is noted that a processor 240 can be utilized as a database with generated functionality strategies, and potentially algorithms, being stored in volatile cache 242 of the processor 240.

The ability to utilize a processor 240 to store functionality strategies for one or more components allow nearly any downstream component to be controlled as part of a cohesive automation system. For instance, newly addressed components utilizing different communication protocols, operating software, and security schemes can be efficiently incorporated into a uniform automation protocol, software, and security scheme via a processor 240 translating component communications as prescribed by the functionality strategy. Such processor 240 operation is particularly useful in retrofit environments where a processor 240 is introduced to an existing automation system with component, and perhaps hosts, that do not employ a common protocol, software, and/or security scheme.

As shown in the non-limiting functionality strategy of FIG. 8, a processor 240 can prescribe one or more measurements to be conducted by one or more components in accordance with an automation procedure. For example, a component may be assigned a verification measurement to ensure accurate operation of a different system component. The measurement(s) prescribed by the functionality strategy can be tied to one or more triggers that act as operational thresholds that are either met or not met. Such triggers can be linked to at least one notification that sends a predetermined signal, such as a command, to a host, and/or user. A notification may take a variety of forms, such as a simple information note, a logged operational datapoint, or a command that alters system operation.

While the functionality strategy can involve reactive triggers and notifications for any type and number of measured operational parameters, the strategy can also involve one or more proactive functions that can be active continuously, sporadically, or routinely. An example function can utilize real-time measurements to detect an operational condition, such as a flow rate or successful completion of an automated task. A function may utilize one or more algorithms to convert measurements into a form that can be analyzed. For instance, multiple different optical, environmental, and fluid measurements may be converted into an operational form that indicates whether or not prescribed automated tasks are being successfully completed within defined time restraints.

The functionality strategy can further involve the execution of one or more actions at prescribed times. An action may be an automated task, a cyclic mechanical or electrical activation, or an activation of a previously inactive system device. It is contemplated that the functionality strategy can concurrently execute multiple different tasks in a proactive, or reactive manner to verify, evaluate, and/or participate in an automated procedure. Through the generation and implementation of a functionality strategy by a host, server, or device, processor, an existing system can be repurposed with the simple incorporation of a PROCESSOR 240.

Figure 9:
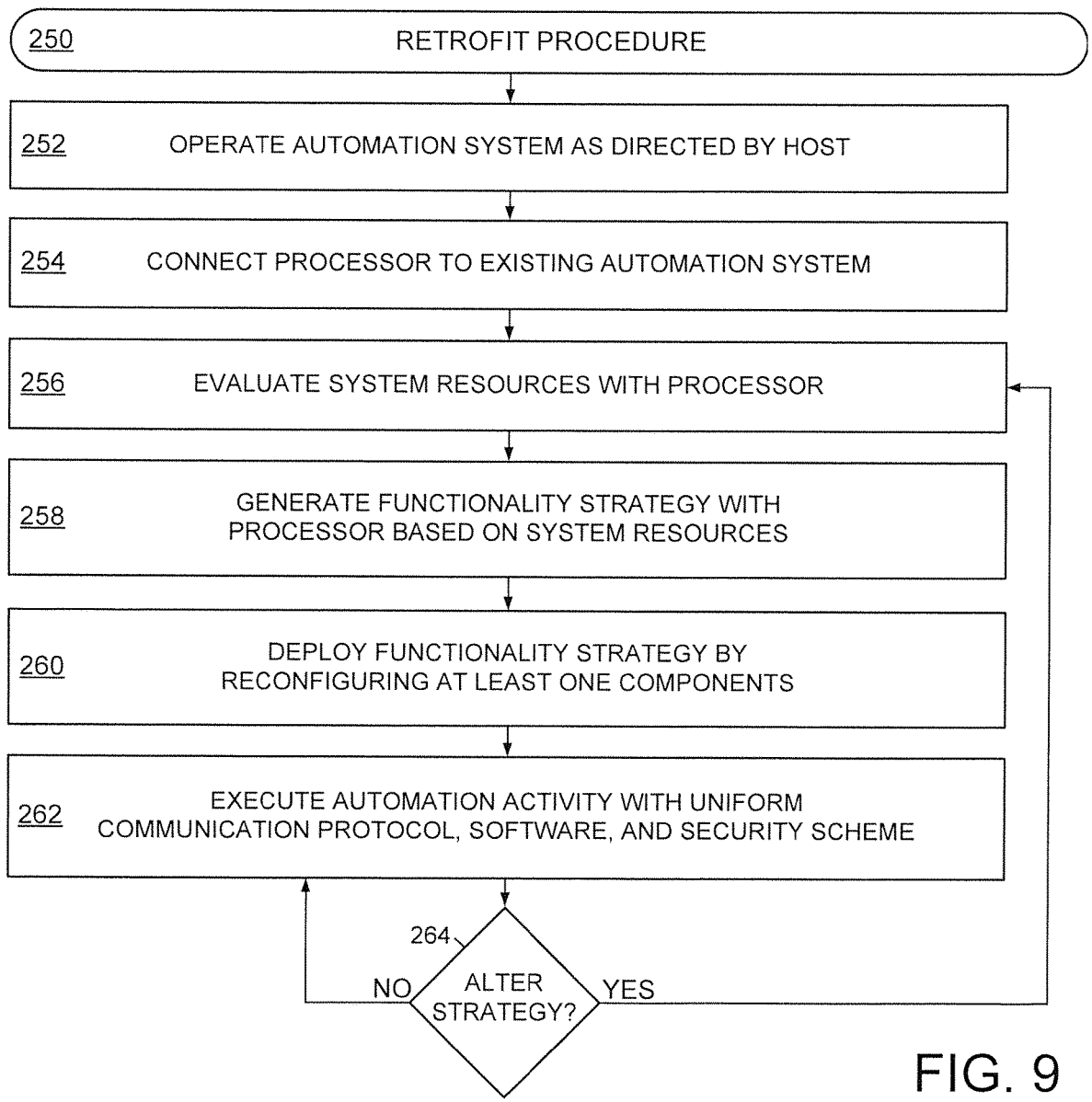
FIG. 9 shows an example retrofit procedure that can be executed with an automation system in accordance with some embodiments.

FIG. 9 is an example retrofit procedure 250 that can be carried out with an automation system in accordance with assorted embodiments. The retrofit procedure 250 can occur in nearly any existing system where devices carry out instructions from a host. It is contemplated that an existing system can operate in step 252 for any length of time and involve any number and type of tasks to accomplish one or more prescribed results. Step 252 is expected to operate with an initial communication protocol, software, and security scheme.

At some time after step 252, at least one processor, such as processor 240, is electrically connected to one or more aspects of the system, such as a host, server, or device, in step 254. The electrical connection of a processor in step 254 may coincide with physical connection of a retrofit module that includes a processor in an environmentally protected housing to a component of the system, such as a site server or device. The electrical introduction of the processor to the system allows step 256 to evaluate the system resources and current configuration, which may include the performance, reliability, and age of various system components as well as the initial communication protocol, software, and security scheme.

Identification of the configuration, capabilities, and characteristics of the current system provides enough data for the processor to generate a functionality strategy in step 258 for at least one system component to optimize system operation. The functionality strategy can be complemented by the generation of a communication strategy and/or security strategy generated by the processor. For instance, a communication strategy can evaluate the currently employed communication protocols and optimize communication between various hosts, servers, and devices by converting to a uniform communication and software protocol, such as OPC-UA. Likewise, a processor can optimize system security by converting to a uniform scheme if the existing security scheme is deemed inferior.

It is contemplated that the various strategies developed in step 258 based on the current operational conditions of the system are then deployed in step 260. Deployment of step 260 may involve one or more component reconfigurations, such as power resets, software resets, and/or operational refreshes. In some embodiments, deployment of step 260 involves one or more tests that verify the accurate incorporation of the various strategies and the reliable operation of the assorted aspects of the system. As a result, step 262 can execute at least one automation activity with uniform communication protocol, software, and security scheme among multiple different components of the automation system. The executed automation activity performed in step 262 is not limited to a particular task, but may involve the manufacture, assembly, collection, or distribution of tangible resources as prescribed by the functionality strategy.

Any number and type of automation activities can be carried out in step 262 over time. One or more processor of the automation, in decision 264, evaluate if the functionality strategy remains valid and the optimal utilization of the automation system. For instance, decision 264 may continuously, sporadically, or routinely scan some, or all, of the automation system for changes, such as alterations to component performance, removal of components, addition of components, load on one or more hosts, number of hosts, and age of the existing functionality strategy. Decision 264 may conduct one or more status polls, or tests, that indicate if the automation system is operating at optimal performance with the current functionality strategy.

If the current functionality strategy is optimal, the procedure returns to step 262. However, a need for a strategy alteration prompts a return to step 256 where the automation system is re-evaluated to generate a new functionality strategy. It is contemplated that decision 264 can return to step 256 even if a current functionality strategy is considered optimal, such as if the current functionality strategy becomes older than a predetermined age threshold. Regardless of the reason why decision 264 triggers the generation of a new functionality strategy, revisiting steps 256-262 allows a processor to produce a functionality strategy based on the most current system resources and capabilities that is efficiently implemented and executed due to the uniformity of communication protocol, software, and security used to carry out the functionality strategy.

While a processor may execute a functionality strategy alone, some embodiments configure a security module to be implemented into a portion of an automation system. A security module can be incorporated into a processor, or other portions of a device, server, or host, to direct the generation and implementation of security aspects of a functionality strategy. That is, a processor may create and deploy data and system security measures alone or via a security module that is part of, or connected to, the processor.

Figure 10:
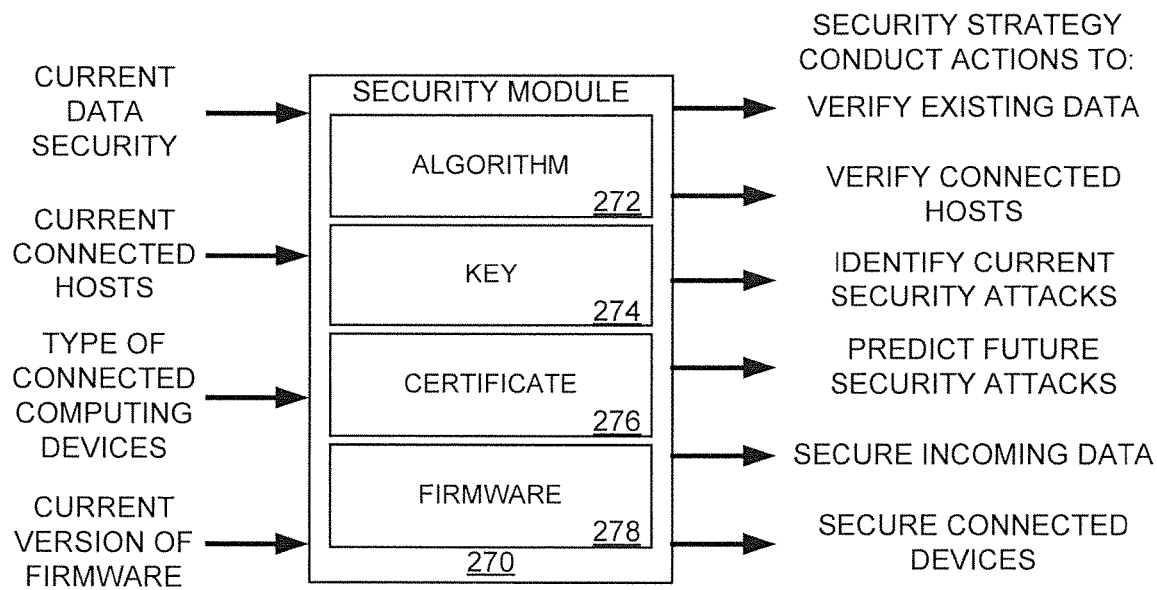
FIG. 10 illustrates an example security module that may be utilized in an automation system in various embodiments.

FIG. 10 illustrates an example security module 270 that can be employed in various aspects of an automation system in accordance with assorted embodiments. The security module 270 can be resident in memory or a processor or a component, device, server, or host to provide any number of algorithms 272, keys 274, certificates 276, and firmware 278 to allow data, automated components, devices, and hosts to be verified and secured. It is noted that a security scheme can be characterized as the various means with which a system secures data and signal connections, such as the type and level of encryption, timing of handshakes, or requirement of firmware version.

The security module 270 can utilize a local, or remote, controller/processor to generate a security strategy by assessing at least the current system security parameters, current number of connected hosts, current type of connected automated devices, and current version of operating firmware. The security strategy generated by the security module 270 then outputs one or more alterations to system operations to increase data, and host, security.

An example security strategy generated by a security module 270 prescribes one or more actions to verify existing connections and data stored in the various components, devices, servers, and hosts. Such verified connections and data allow the security module 270 to secure incoming data from remote sources, secure each automated device of the system, verify connected hosts, identify current security attacks, and predict future security attacks. It is contemplated that the security module 270 conducts any number, and type, of data access operations, such as data reads, data writes, test pattern deployment, and redundant operations, in accordance with the security strategy to arrive at the verification and securement of data, devices, components, servers, and hosts connected to the employed by an automation system.

As a result of the execution of the security strategy, portions of an automation system can enjoy operation free of attacks from existing software, firmware, or connected component. Along with securing an existing system in a reactive manner, a security strategy can be used to increase the security of an automation system by taking proactive measures, as needed. For example, data and connections between system components can have strengthened security by employing a heightened security scheme, such as greater encryption strength, redundant verifications, or connection handshakes. Hence, it is contemplated that portions of an automated system employ different security measures, as directed by the security module 270, to provide a balance between secure and efficient system operation.

Figure 11:
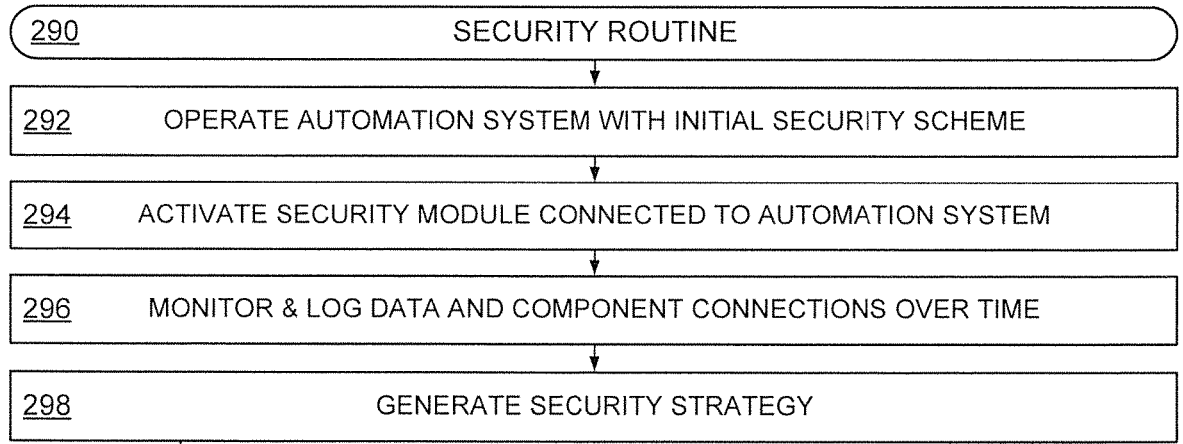
FIG. 11 conveys an example security routine that can be carried out by an automation system in accordance with assorted embodiments.
Figure 11:
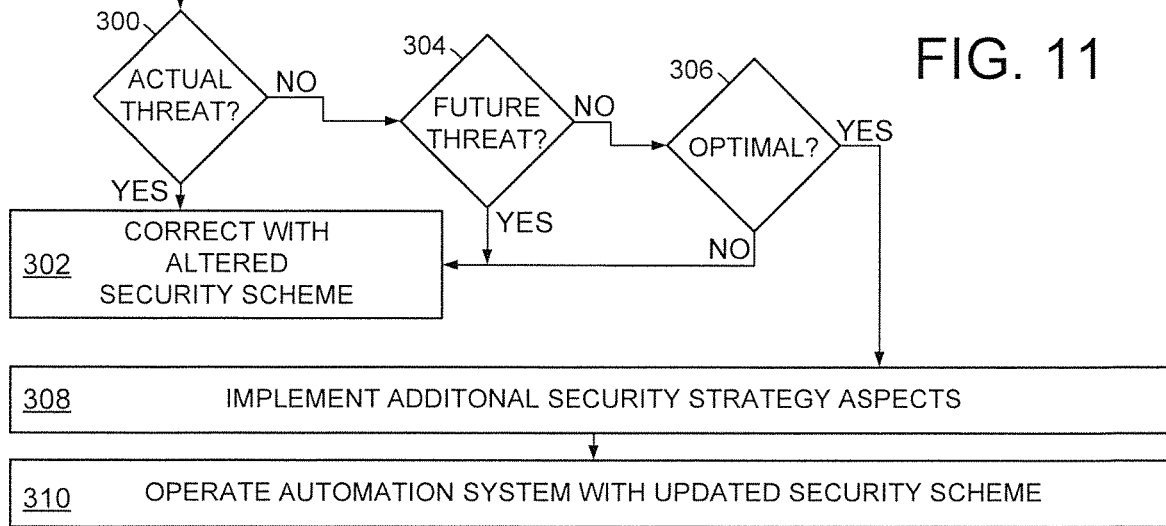

An example security routine 290 is shown in FIG. 11 and can be carried out by any automation system employing a security module in accordance with various embodiments. It is noted that the security routine 290 can be utilized in part, or as a whole, by an existing or original automation system in retrofit or original equipment configurations. As such, routine 290 may begin with step 292 operating an existing automation system with initial security scheme (retrofit) or may begin with step 294 activating a security module connected to an automated system installed during initial installation of an automation system equipment (original). In the case of a retrofit application where a security module is connected to an automation system after the system has been operated with initially installed security scheme(s) in step 292, the routine 290 will proceed to step 294, as shown.

Regardless of whether the routine 290 begins with step 292 or 294, an activated security module connected to an automation system automatically monitors and logs system activity involved, at least with, data generation, data transfers, device-to-device connections, and host-to-device connections in step 296. The monitoring of step 296 may utilize one or more tests, such as data pattern writing and reading, sample signal transfer, or encryption verification, that are not involved with normal, or predetermined, system operation. The security module can produce a security strategy in step 298 in response to the logged system activities to secure the automation system data and respective signal connections.

A security module in step 296 can utilize the logged system activities to evaluate a number of different actual, and potential, security risks, such as side channel attacks, data breach, and firmware hacking. Such evaluation allows a security module to determine if an actual security threat is currently present in decision 300. If so, step 302 is triggered by the security module with instructions on how to alter the present security scheme to reduce, or eliminate, the current risk of attack within the security strategy generated in step 298. The security module additionally can determine if a potential security threat is present in an automation system in decision 304. A potential security threat can correspond with a risk of attack being above a predetermined threshold where the risk of attack is calculated by the security module as a percentage likelihood of attack by an unauthorized third party based on the current system security scheme.

A heightened risk of future system attacks prompts step 302 to take proactive corrective alterations to the current system security scheme to reduce the risk of attack with in the security strategy generated in step 298. Once the risk of third party attacks to the automation system are below predetermined levels, a security module can evaluate the current security scheme for efficiency with the current hardware and software of the system in decision 306. That is, decision 306 can determine if the current security scheme provides optimal performance for the automation system. For instance, decision 306 can evaluate if the security scheme is a performance bottleneck, such as for data transfer latency, signal generation delay, or connection initialization delay. A determination that the current security scheme results in sub-optimal system performance prompts step 302 to take reactive and/or proactive measures to alter the security scheme to provide optimal operational performance within the security strategy generated in step 298.

An automation system having low current and potential threat of attacks along with optimal hardware, software, and firmware performance can operate continuously, or sporadically, for any length of time to conduct any number of automated tasks. At any time, step 308 can implement any additional alterations to the security scheme to conform to the security strategy generated in step 298. In other words, aspects of the security strategy may not be implemented in step 302 and is therefore installed, configured, and deployed in step 308 so that the security strategy is fully present when step 310 operates the automation system with the updated security scheme.

In some embodiments, step 310 is conducted concurrently with step 296 monitoring system activity, which can produce revised security strategies that adapt to changing system conditions. Hence, the security routine 290 can respond to changing hardware, firmware, software, and operational conditions for an automation system with updated security strategies that maintain optimal operational performance along with reduced risk of third party attacks. The ability to connect a security module to an existing automation system and automatically implement a security strategy that secures existing data, connections, and components provides a retrofit capability that autonomously acts to provide a balance of security and operational performance based on real-time current system hardware and operational characteristics.

Figure 12:
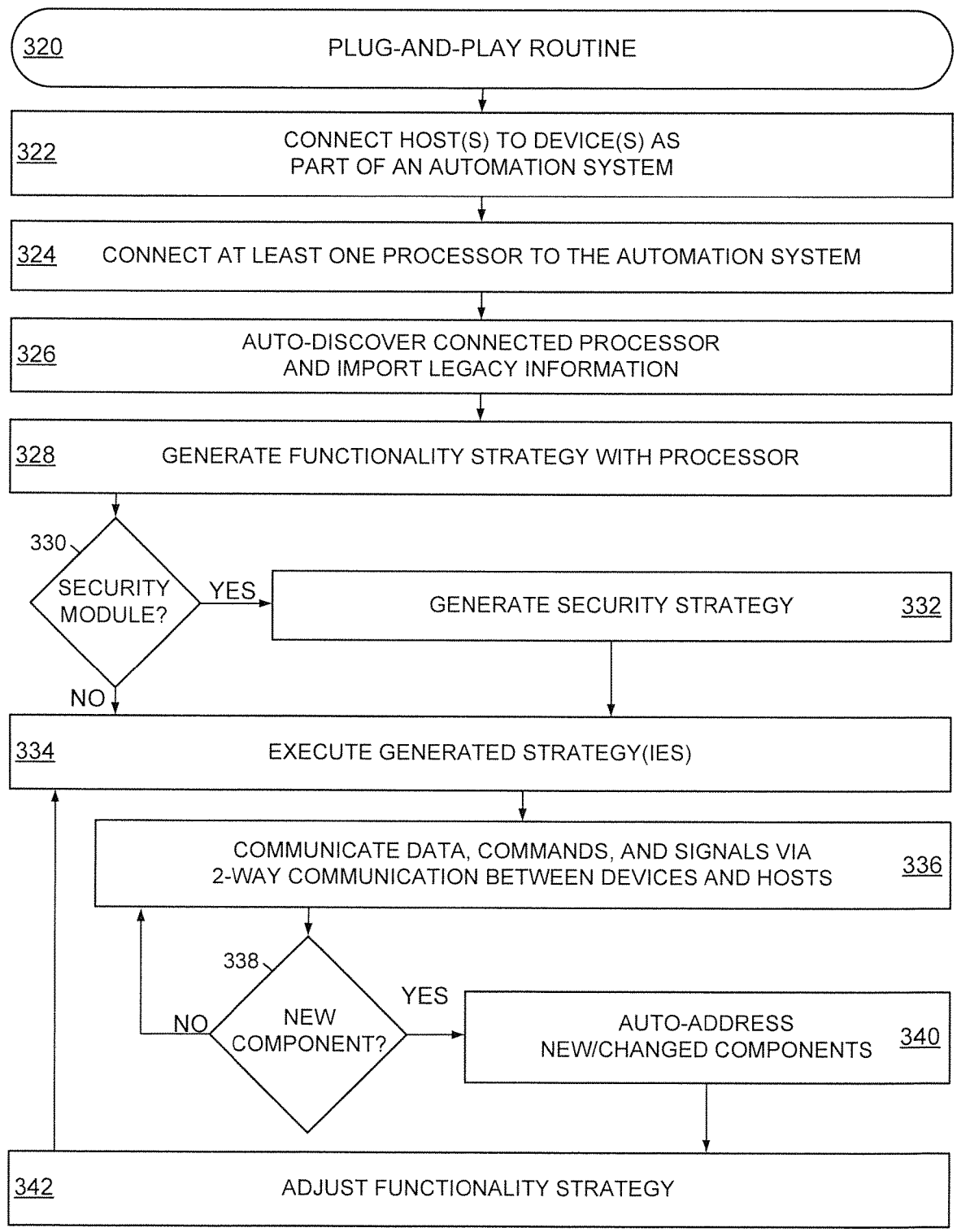
FIG. 12 is an example plug-and-play routine that can be executed in an automation system in some embodiments.

The automatic generation and implementation of a security scheme allows an automation system to operate with minimal user involvement. In contrast to traditional security scheme alterations that involved user reprogramming most, if not all, the components in a system, a security module provides a plug-and-play capability that automatically optimizes an automation system upon installation. However, the plug-and-play optimization of an automation system is not limited to system security as any hardware, software, and firmware alteration can be automatically implemented and optimized in accordance with some embodiments. An example plug-and-play routine 320 is displayed in FIG. 12 and can be conducted with any automation system.

As shown, routine 320 can begin with any number of hosts being connected to any number of devices in step 322 as part of an automation system. The connection of hosts and devices can correspond with initial hardware, software, firmware, and security configurations that allow system operation for any number of automation tasks. It is noted that such initial configurations can be generally characterized as legacy information of which some is stored in the respective devices executing automation instructions to produce automated tasks.

In step 324, at least one processor are newly connected to the automation system. The processor may be in the form of a physical controller module attached to a device or a stand-alone device. A processor may alternatively be physically distal from a device as part of a server or a host. The processor connected in step 324 is contemplated to have at least a processor and local memory that may, or may not, utilize a security module. Some embodiments can utilize multiple different processor in a single automation system to control and optimize bifurcated portions of an automation system. Other embodiments utilize redundant processor in a single automation system.

The connection of one or more processor to an automation system automatically triggers the processor to import legacy information from the respective hosts, servers, devices, and other components as part of an auto-discover operation in step 326. The execution of an auto-discover operation results in the processor identifying hardware and operational configurations of the automation system without a user inputting each component and connection of the system manually. Such automatic discovery of system hardware further involves processor storage of at least the unique ID and INFO stored in each automated device from the device manufacturer.

The discovered system resources and initial operational configurations allows the processor to then automatically generates a functionality strategy in step 328 that optimizes operation of at least one device of the automation system. The functionality strategy may coincide with a security strategy developed by a security module of the system. Decision 330 determines if a security module is present. If so, step 332 generates a security strategy in accordance with security routine 290. If no security module is present, it is contemplated the functionality strategy involves security scheme alteration, but such alteration is not required or limiting.

At the conclusion of step 332, or if no security module is active, the functionality and any security strategies are executed in step 334. Such execution in step 334 may also be characterized as strategy deployment and may involve reconfiguring, and/or resetting, one or more components of the automation system. The execution of the strategy, or strategies, allows step 336 to communicate data, commands, and/or signals via two-way communications between devices alone and between hosts and devices. That is, data, commands, and other signals can pass to devices from other devices and from devices to other devices or hosts.

The ability to utilize two-way communications allows the functionality strategy to optimize system efficiency, performance, and reliability by passing commands and data between devices without passing through a server or other host. For example, a device can receive instructions from a host, execute the instructions, and subsequently issue commands to other devices directly as a result of the host-issued instruction without involving any host or other top-level control. It is contemplated that all communication conducted in step 336 has a uniform protocol, interface, and software, such as OPC-UA, regardless of the number, type, and speed of the protocol used prior to step 324, but multiple different protocol may be called for by the functionality strategy. In another non-limiting example, devices, servers, and hosts can be converted to a uniform communication protocol automatically via the connected processor to allow the functionality strategy to optimize two-way communication in step 336.

The execution of functionality and security strategies along with two-way communications in steps 334 and 336 can be conducted for any amount of time to complete any number of automated tasks as directed by the hosts and connected processor. Decision 338 evaluates if any new components are introduced into the automation system. A new component may consist of an added device, server, or host or an altered device, server, or host. An alteration may be a physical, electrical, functional, and/or operational change that may be a result of user manipulation, environmental manipulation, or device manipulation. For instance, an alteration may be a user changing a device parameter or characteristic, a change in temperature, or a modification to the physical or electrical operation of the device without user influence.

The detection of a new/altered component prompts step 340 to auto-address each of the component(s). An auto-address operation employs the connected processor to automatically generate a unique address that logically locates a component with the address being based on the unique information stored in the component from the factory, such as the serial number, type, size, or identification value. It is contemplated that the auto-addressing of step 340 is conducted for one or more components of the automation system in step 326 as part of the auto-discover process. Hence, the processor can auto-discover each component of a system and subsequently generate a unique address for each component automatically so that each component can be individually located, logically.

The identification and addressing of a new and/or changed component causes step 342 to revisit the functionality strategy generated in step 328. As a result of the added, or changed, capabilities of the system associated with the new/altered component, the functionality strategy can be changed, added to, or consolidated to optimize the automation system based on current component configurations and capabilities. It is noted that the various aspects of the routines and procedure 220/250/290/320 can be changed or removed at will just as decisions or steps can be added. Hence, the order and content of the assorted routines/procedure are merely exemplary and are not limiting.

Through the various embodiments of the present disclosure, an automation system can be optimized through the use of a processor that allows auto-discovery and auto-addressing of system components. The generation of unique addresses for system components allows two-way communications that increases automation reliability, efficiency, and operational performance. The ability to generate and alter functionality and security strategies based on detected system components and capabilities further optimize an automation system over time.

What is claimed is:

1. A method comprising:

activating a host connected to a first device and a second device via a network, the first device comprising a processor;

assigning a first address to the first device with the processor in response to factory information imported from the first device, the first address comprising at least one identifier supplied by the host and at least one identifier corresponding with the factory information from the first device;

assigning a second address to the second device with the processor in response to factory information imported from the second device, the second address comprising at least one identifier supplied by the host and at least one identifier corresponding with the factory information from the second device;

executing at least one automation activity with the first device;

employing the first and second addresses to conduct device-to-device communications; and conducting a first two-way communication between the second device and the host, the first two-way communication executes a functionality strategy generated by the in response to connection of the second device to the network, the functionality strategy comprising a translation aspect to allow communications between two different communications protocols respectively utilized by the first device and the second device.

2. The method of claim 1, wherein the factory information comprises a serial number.

3. The method of claim 1, wherein the factory information comprises an operational parameter.

4. The method of claim 1, wherein the factory information of each device is stored in a local memory of the respective devices programmed during manufacture of the second device.

5. The method of claim 1, wherein the first address is hierarchical.

6. The method of claim 1, wherein the processor is positioned within a housing and physically attached to the first device.

7. The method of claim 1, wherein the respective first address is different than the second address.

8. The method of claim 1, wherein a second two-way communication is conducted between the first device and the host concurrently with the first two-way communication.

9. The method of claim 1, wherein the first two-way communication is initiated by the second device.

10. The method of claim 1, wherein the device-to-device communications pass directly between the first device and the second device in response to the at least one automation activity.

11. The method of claim 1, wherein a first device-to-device communication is initialized by the first device and a second device-to-device communication is initialized by the second device.

12. A method comprising:
activating a host connected to a first device via a network, the first device comprising a processor;
assigning a first address to the first device with the processor;
importing factory information with the processor from a second device connected to the first device via the network;
assigning a second address for the second device with the processor, the second address comprising at least one identifier supplied by the host, a first device identifier corresponding with the factory information, and a second device identifier corresponding with the factory information, the first and second device identifiers being different;
executing at least one automation activity with the first device; and
employing the first and second addresses to conduct device-to-device communications the device-to-device communication executes a functionality strategy generated by the in response to connection of the second device to the network, the functionality strategy comprising a translation aspect to allow communications between two different communications protocols respectively utilized by the first device and the second device.

13. The method of claim 12, wherein the first device and second device are each deployed with the respective first address and second address without reconfiguring the host or processor.

14. The method of claim 12, wherein the first device and second device are each deployed autonomously by the processor.

15. The method of claim 12, wherein the first device and second device are each deployed by updating at least one database during a time selected by the processor.

16. The method of claim 12, wherein the device-to-device communications do not pass through the host.

17. The method of claim 12, wherein the processor executes a retrofit procedure in response to the second device being connected to the network.

18. The method of claim 12, wherein at least two address identifiers are supplied by the host and at least two address identifiers are supplied by the factory information of the second device.

* * * * *